UNITED STATES PATENT OFFICE.

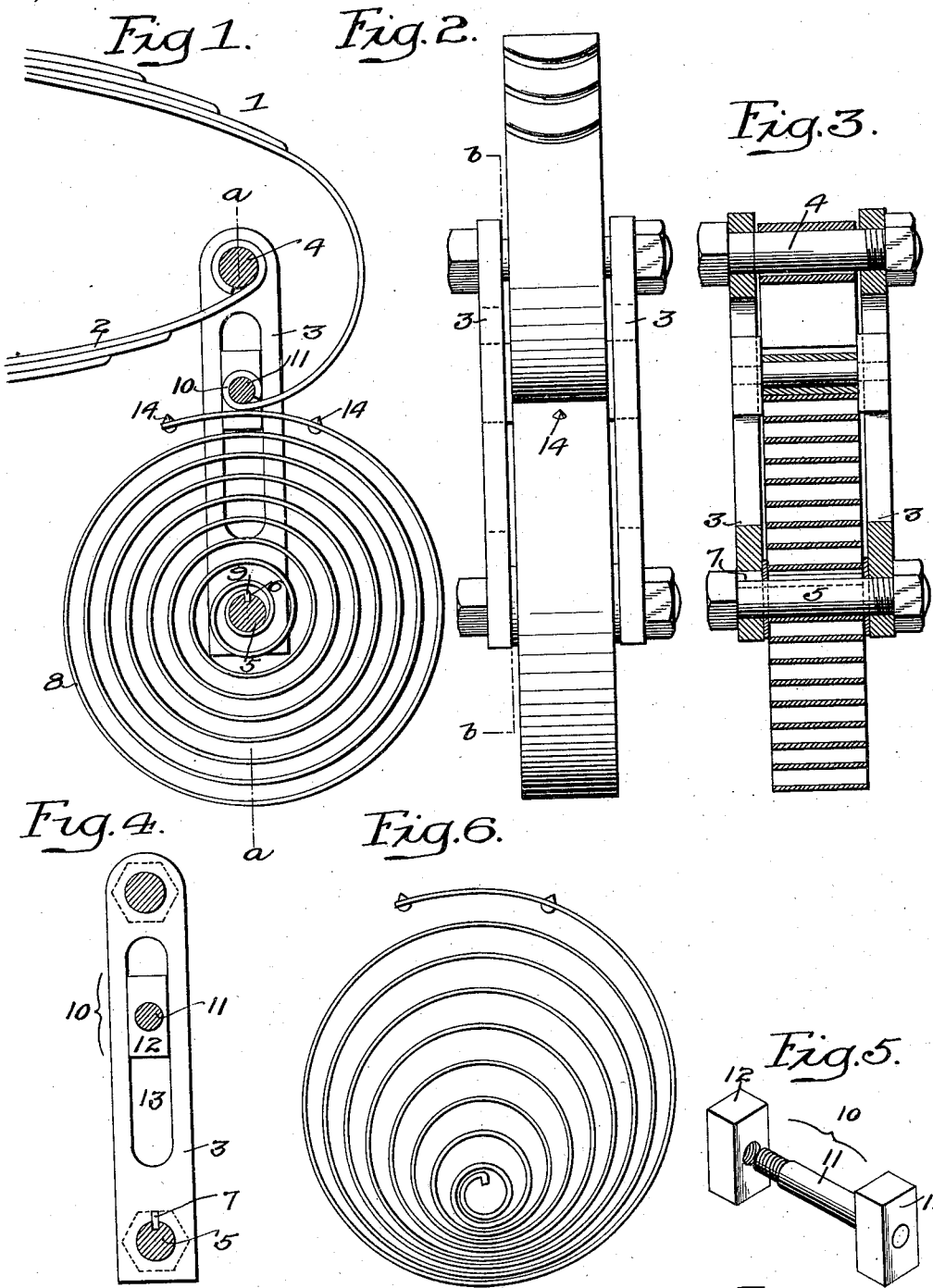

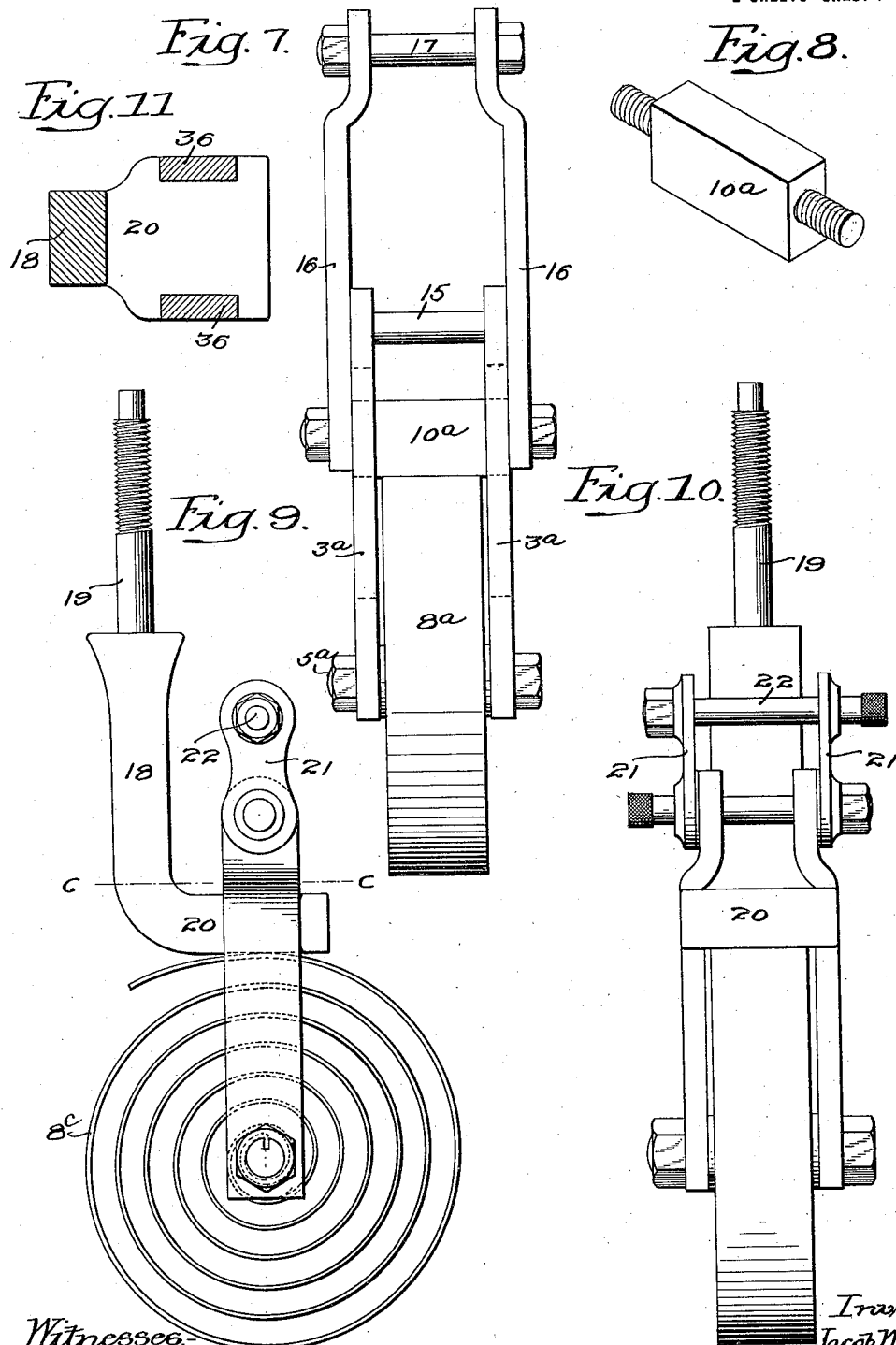

JACOB W. LATTIG, OF GLENSIDE, PENNSYLVANIA, ASSIGNOR TO HATTIE M. RODMAN, OF LOUISVILLE, KENTUCKY.

SHOCK-ABSORBER.

1,178,862.  Specification of Letters Patent.  Patented Apr. 11, 1916.

Application filed March 23, 1914. Serial No. 826,688.

*To all whom it may concern:*

Be it known that I, JACOB W. LATTIG, a citizen of the United States, residing in Glenside, county of Montgomery, State of Pennsylvania, have invented certain Improvements in Shock-Absorbers, of which the following is a specification.

My invention relates to certain improvements in that type of shock absorbers which is fully illustrated and described in a patent granted to me on July 8, 1913, No. 1,066,508.

One object of the invention is to improve the construction of this type of shock absorber. This object I accomplish by making the convolute spring independent of the sliding member and allowing the outer end of the spring to have a free movement.

A further object of the invention is to provide the sliding member with blocks which travel in the slots of the links.

A still further object of the invention is to make the spring eccentric so that, when it is assembled, the convolutions will be substantially equidistant.

In the accompanying drawings: Figure 1 is a side view of my improved shock absorber; Fig. 2 is an end view; Fig. 3 is a sectional view on the line $a-a$, Fig. 1; Fig. 4 is a sectional view on the line $b-b$, Fig. 2; Fig. 5 is a detached perspective view of the sliding member; Fig. 6 is a side view of the spring prior to its being located in the shock absorber and before the load is applied; Fig. 7 is a view illustrating a modification of the arrangement of the link and the sliding member as applied to the front of an automobile; Fig. 8 is a perspective view of the sliding member illustrated in Fig. 7; Fig. 9 is a side view showing the invention adapted to be used in connection with a vehicle in which one element is secured to the vehicle frame and the other to the spring; Fig. 10 is an end view of the device illustrated in Fig. 9; and Fig. 11 is a sectional plan view on the line $c-c$, Fig. 9.

This invention is particularly adapted for use in connection with motor driven vehicles in order to relieve the body of the vehicle from shocks. It may be located, as illustrated in Fig. 1, between the two members of a double spring or it may be placed between the frame and the end of a single spring, as illustrated in Figs. 7 and 9 of the drawings, according to the type of vehicle to which the invention is applied and the location of the shock absorber thereon.

Referring, in the first instance, to Figs. 1 to 6 inclusive, 1 is the upper spring of the vehicle. 2 is the lower spring. 3, 3 are two links having a bolt or bar 4 which passes through the eye in the lower spring 2. At the lower end of the links is a bolt 5 having a longitudinal slot 6 and in one of the links 3 is a slot for the reception of a key 7, Figs. 3 and 4, which prevents the bolt 5 from turning on the link. 8 is a convolute spring having an end 9 bent abruptly and extending into the slot 6 in the bolt 5 so that the spring cannot turn on the bolt. 10 is a sliding member consisting of a round bar 11 threaded at each end and two blocks elongated, as shown in Fig. 5, and are threaded ends of the bar. The blocks are 12 having threaded openings to receive the adapted to slots 13 in the links 3 so that the sliding member is free to move to and from the bolt 4. The bar 11 passes through the eye of the spring 1, which is located between the two links 3, 3, as clearly shown in the drawings, and the free end of the convolute spring 8 bears against the under side of the eye of the spring, as illustrated in Fig. 1, and is free to move longitudinally to a limited extent, due to the action of the vehicle when in motion. I preferably provide stops 14 on the free end of the spring 8 on each side of its bearing point, as shown, so that in the event of the spring creeping too far in either direction, further movement will be prevented by the stops. The spring, as illustrated in Fig. 6, is made eccentric, the convolutions of the lower half being comparatively close together, while the convolutions on the upper half are spaced an equal distance apart. The amount of eccentricity will depend upon the weight of the vehicle to which the spring is to be applied as it is desirable, when the shock absorber is applied to a vehicle and the load is placed thereon, that the convolutions of the spring are substantially concentric.

When the vehicle passes over an obstruction, for instance, the sliding member moves toward the center of the spring, compressing the upper portion thereof and after it leaves the obstruction there is a rebound, but this is controlled as it causes the compression of the lower portion of the spring and, consequently, the shock is absorbed and the spring returns to its normal position as illustrated in Fig. 1.

In Fig. 7, I have illustrated a construction used in connection with a single front spring of a vehicle. One end of the spring is attached to the frame and the other is attached to the cross bar 15, extending from one link 3ª to the other. The links are slotted as shown by dotted lines and the sliding member 10ª travels in the slots and has threaded projecting portions which extend through openings in the link 16 which are attached, in turn, to the frame of the vehicle by a bolt 17. The spring 8ª is mounted on the bolt 5ª and the free end bears against the under side of the sliding member 10ª.

Figs. 9, 10 and 11 illustrate another modification in which one member is attached to the frame of the vehicle and the other to the spring. 18 is a bracket having a threaded portion 19, which is secured to the vehicle body and this bracket has a lateral extension 20 slotted at each side to receive the links 3ᵇ, as illustrated in Fig. 11. The lower ends of the links carry the convolute spring 8ᶜ, the free end of which rests against the under side of the portion 20 of the bracket and attached to the upper ends of the links 3ᵇ are short links 21 carrying the bolt 22 to which the spring of the vehicle is attached so that any shock to the vehicle, when it is traveling over a rough road, will be absorbed by the spring 8ª.

In each form of the device above described, the outer end of the convolute spring is not attached to the sliding member or to one of the springs of the vehicle, but bears against the under side of the sliding member and is free to move longitudinally. The sliding member has a wide bearing surface which holds the parts in the proper relation.

I claim:

1. The combination in a shock absorber, of two links; a sliding member arranged to slide in respect to the links; a bolt extending from one link to the other; and a convolute spring secured to the bolt, the free end of the spring bearing against the sliding member but not connected thereto, the links being connected to one element of the vehicle and the sliding member being connected to another element of the vehicle body.

2. The combination in a shock absorber, of a convolute spring; a bolt to which the spring is secured; links carrying the bolt; and a sliding member arranged to slide with respect to the links, the bolt being connected to one element of the vehicle, the sliding element being connected to another element of the vehicle, the free end of the convolute spring resting against the sliding member so that it will move vertically therewith and will slide longitudinally thereon.

3. The combination in a shock absorber for vehicles, of two links spaced apart, each link having a longitudinal slot therein; a sliding member having extended flat portions located in the slots of the links; a bolt extending from one link to the other below the sliding member, said bolt being held rigidly to one of the links; a convolute spring mounted on the bolt and having its inner end secured thereto, the free outer end of the spring resting against the under side of the sliding member.

4. The combination in a shock absorber, of two springs of a vehicle; a pair of links hung from the lower spring, said links being slotted; a sliding member mounted in the slotted portion of the links and connected to the upper spring of the vehicle; a bolt secured to the lower end of the links; means for preventing the bolt from turning therein; a convolute spring having its inner end engaging the bolt so that it will be held in a fixed position with respect to the links, the free end of the spring bearing against the under side of the sliding member but not attached thereto.

5. The combination in a shock absorber, of two links spaced apart; a bolt secured to the lower portions of the links; a convolute spring secured to the bolt; said links being slotted; a sliding member mounted in the slots, the free end of the spring bearing against the sliding member; said spring having stops thereon located on each side of the bearing point and some distance therefrom so that the free end of the spring will be allowed to have a limited longitudinal movement.

6. The combination in a shock absorber, of two links, each link having a longitudinal slot therein; a bolt extending from one link to the other at the lower end thereof, said bolt having a longitudinal slot therein; a key in the slot and engaging one of the links; a convolute spring having its inner end bent and extending into the slot in the bolt so as to hold the inner end of the spring firmly to the bolt and to the links; a sliding member consisting of a cross bar threaded at each end; two blocks having threaded openings to receive the threaded ends of the bar; the blocks being located in the slots of the links; and a bolt extending from one link to the other at the upper end, the said bolt engaging one spring of the vehicle and the sliding member engaging the other spring of the vehicle.

In testimony whereof, I have signed my name to this specification, in the presence of two subscribing witnesses.

JACOB W. LATTIG.

Witnesses:
MURRAY C. BOYER,
JOS. H. KLEIN.